United States Patent
Ye et al.

(10) Patent No.: US 9,999,316 B2
(45) Date of Patent: Jun. 19, 2018

(54) BEVERAGE SUBSTANCE CARTRIDGE, WATER FILLING APPARATUS, BEVERAGE PRODUCING EQUIPMENT, BEVERAGE PRODUCING SYSTEM AND BEVERAGE PRODUCING METHOD

(75) Inventors: Yangsheng Ye, Putuo District (CN); Yusheng Shi, Putuo District (CN)

(73) Assignee: TEATEK CO., LTD., Shanghai (CN)

( * ) Notice: Subject to any disclaimer, the term of this patent is extended or adjusted under 35 U.S.C. 154(b) by 773 days.

(21) Appl. No.: 13/698,717

(22) PCT Filed: May 19, 2011

(86) PCT No.: PCT/CN2011/074353
§ 371 (c)(1),
(2), (4) Date: Feb. 4, 2013

(87) PCT Pub. No.: WO2011/144047
PCT Pub. Date: Nov. 24, 2011

(65) Prior Publication Data
US 2013/0129871 A1    May 23, 2013

(30) Foreign Application Priority Data

May 20, 2010  (CN) .......................... 2010 1 0179507
May 20, 2010  (CN) .......................... 2010 1 0179518
(Continued)

(51) Int. Cl.
*A47J 31/44*    (2006.01)
*A47J 31/36*    (2006.01)
(Continued)

(52) U.S. Cl.
CPC ............. *A47J 31/4492* (2013.01); *A23F 3/18* (2013.01); *A47J 31/0642* (2013.01);
(Continued)

(58) Field of Classification Search
CPC .. A47J 31/0642; A47J 31/3623; A47J 31/407; A47J 31/4492; A47J 31/3638; B65D 85/8043
(Continued)

(56) References Cited

U.S. PATENT DOCUMENTS 3,713,377 A * 1/1973 Arnett ................. A47J 31/0642
99/283
4,867,993 A * 9/1989 Nordskog ....................... 426/77
(Continued)

FOREIGN PATENT DOCUMENTS

CN      2233911 Y    8/1996
CN      1408309 A    4/2003
(Continued)

OTHER PUBLICATIONS

Int'l Search Report dated Sep. 1, 2011 in Int'l Application No. PCT/CN2011/074353.
(Continued)

*Primary Examiner* — Erik Kashnikow
*Assistant Examiner* — Chaim A Smith
(74) *Attorney, Agent, or Firm* — Im IP Law; C. Andrew Im

(57) ABSTRACT

A beverage substance cartridge, a tea filtering apparatus, a beverage producing equipment, a beverage producing system and a beverage producing method are provided to efficiently solve the problems of slow tea leaf extraction, long wait time for tea drinker, low tea water temperature and bad tea water taste. The water filling apparatus of the beverage producing equipment fills hot water into the bottom of the beverage substance cartridge near the side wall of the cartridge body, and forms vortex in the beverage substance cartridge which speeds up extraction efficiently. Furthermore, inside convex edges are set at the side wall of the
(Continued)

beverage cartridge and hot water temperature is high enough to strengthen extraction effects and then realize rapid brewing effects in the tea brewing equipment. The beverage producing equipment can be widely applied in offices and homes.

9 Claims, 6 Drawing Sheets

(30) Foreign Application Priority Data

| May 21, 2010 | (CN) | .......................... 2010 1 0181098 |
| May 21, 2010 | (CN) | ..................... 2010 2 0201394 U |
| May 21, 2010 | (CN) | ..................... 2010 2 0201426 U |

(51) Int. Cl.
    *B65D 85/804*     (2006.01)
    *A47J 31/40*     (2006.01)
    *A47J 31/06*     (2006.01)
    *A23F 3/18*     (2006.01)
    *A47J 31/46*     (2006.01)
    *B65D 81/00*     (2006.01)

(52) U.S. Cl.
    CPC ....... *A47J 31/3623* (2013.01); *A47J 31/3638* (2013.01); *A47J 31/407* (2013.01); *A47J 31/46* (2013.01); *B65D 85/8043* (2013.01); *B65D 85/8046* (2013.01); *B65D 2081/007* (2013.01); *B65D 2203/00* (2013.01); *B65D 2203/06* (2013.01)

(58) Field of Classification Search
    USPC ..................................... 426/431–433; 99/295
    See application file for complete search history.

(56) References Cited

U.S. PATENT DOCUMENTS

| 5,393,548 | A | * | 2/1995 | Heiligman | ............ | A47J 31/605 |
| | | | | | | 210/264 |
| 5,927,179 | A | * | 7/1999 | Mordini | .............. | A47J 31/0615 |
| | | | | | | 99/304 |
| 5,974,950 | A | | 11/1999 | King | | |
| 6,025,000 | A | | 2/2000 | Fond et al. | | |
| 6,240,832 | B1 | * | 6/2001 | Schmed | ............. | A47J 31/3623 |
| | | | | | | 221/121 |
| 6,517,880 | B2 | * | 2/2003 | Walters, Jr. | ............. | A23F 5/267 |
| | | | | | | 426/433 |
| 6,645,537 | B2 | * | 11/2003 | Sweeney et al. | .............. | 426/79 |
| 6,849,285 | B2 | | 2/2005 | Masek et al. | | |
| 2002/0020659 | A1 | * | 2/2002 | Sweeney | ............ | B65D 85/8043 |
| | | | | | | 210/416.3 |
| 2002/0048621 | A1 | | 4/2002 | Boyd et al. | | |
| 2003/0070554 | A1 | | 4/2003 | Cortese | | |
| 2004/0180123 | A1 | | 9/2004 | Halliday et al. | | |
| 2004/0197444 | A1 | | 10/2004 | Halliday et al. | | |
| 2005/0150391 | A1 | | 7/2005 | Schifferle | | |
| 2007/0144357 | A1 | * | 6/2007 | Rivera | ................... | A47J 31/08 |
| | | | | | | 99/295 |
| 2007/0203587 | A1 | | 8/2007 | Erlandsson et al. | | |
| 2008/0148948 | A1 | | 6/2008 | Evers et al. | | |
| 2009/0155422 | A1 | * | 6/2009 | Ozanne | ............... | A47J 31/0615 |
| | | | | | | 426/89 |
| 2009/0183640 | A1 | * | 7/2009 | Ozanne | ............... | A47J 31/3695 |
| | | | | | | 99/295 |
| 2009/0205747 | A1 | | 8/2009 | Lillard, Jr. | | |
| 2010/0064899 | A1 | | 3/2010 | Aardenburg | | |
| 2010/0078480 | A1 | | 4/2010 | Aker | | |
| 2010/0166928 | A1 | * | 7/2010 | Stamm | ...................... | A23F 3/18 |
| | | | | | | 426/435 |
| 2010/0282088 | A1 | * | 11/2010 | Deuber | ................... | A47J 31/52 |
| | | | | | | 99/281 |
| 2010/0300299 | A1 | * | 12/2010 | Epars | .................. | A47J 31/3623 |
| | | | | | | 99/288 |
| 2011/0041700 | A1 | * | 2/2011 | Epars | ...................... | A47J 31/06 |
| | | | | | | 99/295 |
| 2013/0014648 | A1 | | 1/2013 | Rognon et al. | | |
| 2013/0064929 | A1 | | 3/2013 | Jarisch et al. | | |
| 2013/0129872 | A1 | | 5/2013 | Kruger | | |
| 2013/0206011 | A1 | | 8/2013 | Ozanne et al. | | |
| 2013/0312619 | A1 | | 11/2013 | Spiegel et al. | | |
| 2014/0134299 | A1 | | 5/2014 | Guidorzi et al. | | |
| 2014/0224130 | A1 | | 8/2014 | Castellani et al. | | |

FOREIGN PATENT DOCUMENTS

| CN | 2671985 | Y | | 1/2005 | | |
| CN | 1593310 | A | | 3/2005 | | |
| CN | 1897853 | A | | 1/2007 | | |
| CN | 101534685 | A | | 9/2009 | | |
| CN | 101588974 | A | | 11/2009 | | |
| CN | 101636333 | A | | 1/2010 | | |
| CN | 201375420 | Y | | 1/2010 | | |
| CN | 100591253 | C | | 2/2010 | | |
| CN | 201418620 | Y | | 3/2010 | | |
| CN | 101828840 | A | | 9/2010 | | |
| CN | 101849768 | A | | 10/2010 | | |
| CN | 101849774 | A | | 10/2010 | | |
| CN | 101862119 | A | | 10/2010 | | |
| CN | 201691687 | U | | 1/2011 | | |
| CN | 201691689 | U | | 1/2011 | | |
| CN | 201691699 | U | | 1/2011 | | |
| EP | 0 615 921 | | * | 9/1994 | ............ | B65D 81/00 |
| EP | 1440640 | A2 | | 7/2004 | | |
| EP | 1890271 | A1 | | 2/2008 | | |
| JP | 2003-012016 | A | | 1/2003 | | |
| JP | 2005-270481 | A | | 10/2005 | | |
| WO | WO 2009024425 | A1 | * | 2/2009 | ............ | A47J 31/52 |

OTHER PUBLICATIONS

Int'l Search Report dated Aug. 25, 2011 in Int'l Application No. PCT/CN2011/074330.

Int'l Search Report dated Sep. 1, 2011 in Int'l Application No. PCT/CN2011/074344.

Office Action dated Sep. 11, 2014 in Chinese Application No. 201180029672.X.

* cited by examiner

BEVERAGE SUBSTANCE CARTRIDGE, WATER FILLING APPARATUS, BEVERAGE PRODUCING EQUIPMENT, BEVERAGE PRODUCING SYSTEM AND BEVERAGE PRODUCING METHOD

CROSS-REFERENCE TO RELATED APPLICATION

This application is a Section 371 of International Application No. PCT/CN2011/074353, filed May 19, 2011, which was published in the Chinese language on Nov. 24, 2011, under International Publication No. WO 2011/144047 A1, and the disclosure of which is incorporated herein by reference.

BACKGROUND OF THE INVENTION

Field of the Invention

The invention relates to beverage production, specifically a beverage substance cartridge, a water filling apparatus, a beverage producing equipment, a beverage producing system and a beverage producing method.

Related Background Art

Drinking tea and tasting tea is a long-lasting tradition in China. People drinking tea not only cultivate their taste, but also can prolong their life. There are over 100 tea leaf varieties in China, every variety has unique characteristics, and different brewing methods are required for different tea leaf varieties to extract different advantages associated with each variety during its brewing. For example, there are different requirements for different tea varieties with respect to water temperatures and brewing times.

Traditional way of drinking tea is to put the tea leaves directly into a tea pot which is then filled with hot water to brew the tea for drinking, but it is inconvenient because all the process is handled and controlled manually. This is manageable for people with lots of spare time or professional tea tasters, but it is too time-consuming for most people, such as people at office who have minimal time to prepare and drink their tea. Furthermore, it is difficult for amateurs to brew tea to perfect taste.

In order to realize automatic tea brewing, a simple automatic tea brewing equipment with a single function was designed (for example, refer to the Chinese invention patent with patent application number 200410041385.2). Although this brewing equipment is able to brew the tea automatically, the tea leaf extraction is very slow in the brewing process, thereby forcing the tea drinkers wait a long time before they drink their tea. The wait can last several minutes and can be even longer than ten minutes for some tea leaves. Hence, rapid brewing cannot be realized with this tea brewing equipment. Moreover, most tea leaves have perfect taste at comparatively high temperature, and if the tea brewing time is too long, the tea water temperature will drop and negatively impact the tea taste and aroma.

SUMMARY OF THE INVENTION

It is, therefore, an object of the invention to provide a beverage substance cartridge, a water filling apparatus, a beverage producing equipment, a beverage producing system and a beverage producing method that solves the aforementioned problems with the present tea brewing equipment, such as slow tea leaf extraction, long wait time, low tea water temperature, bad taste, etc.

In order to realize the abovementioned objects, there is provided a beverage substance cartridge comprising a cartridge body which accommodates substance for beverage production and a sealing cover to seal the substance into the cartridge body. A side wall of the cartridge body is integrally formed of plural arc parts.

The cartridge body is made of polypropylene material. Convex or concave rings are on a bottom of the cartridge body. The substance in the cartridge body can be any one of or a combination of at least two of tea leaf, dried vegetable, dried fruit and Chinese medicinal herb. Also, the substance in the cartridge body can be any one of or a combination of at least two of coffee, milk tea and tang.

There is provided a water filling apparatus which fills water into the beverage substance cartridge. The water filling apparatus comprises a piping section and a piercing point is located on the top of piping section. The piercing point is integrally formed with the piping section. A lower part of the piercing point has a water-filling nozzle and connected to the piping section.

The shape of the piercing point can be cone, polygonal pyramid or multi-edge pyramid. The number of the water filling nozzles can be two, and two water filling nozzles are set on two opposite sides of the piercing point. A sealing rubber cover is positioned at external to the piping section to limit length of the piercing point.

There is provided a beverage producing equipment to produce beverage by using the substance in the beverage substance cartridge as described herein, and comprising: a beverage substance cartridge putting section to receive the beverage substance cartridge; a water supplying section to supply water for beverage production; and a brewing apparatus to brew the substance in the beverage substance cartridge into a beverage.

The brewing apparatus has a heating section which heats the water supplied by the water supplying section, a water filling apparatus which fills the heated water into the beverage substance cartridge and a steeping section which steeps juice of the substance. The water supplying section is connected to a water filling pipe of the water filling apparatus. The brewing apparatus also includes a control section to send commands to the water supplying section, the heating section, the water filling apparatus, a filtering apparatus and a water exporting section.

There is provided a beverage producing system comprising the beverage producing equipment and the beverage substance cartridge, as described herein.

There is provided a beverage producing method to produce a beverage using the beverage producing system, comprising the following steps: 1) the beverage substance cartridge is placed in the beverage substance cartridge putting section; 2) the piercing point of the water filling apparatus pierces the bottom of the cartridge body of the beverage substance cartridge, and the piercing point's piercing position is close to side surface of the cartridge body of the beverage substance cartridge; 3) the water supplying section supplies water for beverage production, and the heating section heats the water supplied by the water supplying section; 4) water heated by the water heating section is filled into the beverage substance cartridge through the piping section and the water filling nozzle of the piercing point; 5) the hot water forms a vortex as the water bumps against the external convex surface and internal convex edge, and brews the beverage substance; and 6) the water exporting section exports brewed beverage.

Thanks to the technical features noted hereinabove, as compared to the present tea brewing equipment, the present invention has the following advantages and positive effects as set forth herein.

The invention provides the beverage substance cartridge, the tea filtering apparatus, the beverage producing equipment, the beverage producing system and the beverage producing method. The water filling apparatus of the beverage producing equipment fills hot water into the bottom of the beverage substance cartridge near the side wall of the cartridge body and forms a vortex in the beverage substance cartridge which efficiently speeds the extraction process. Further, the inside convex edges are set at the side wall of the beverage cartridge and hot water temperature is high enough to strengthen and enhance the extraction effects to realize a rapid brewing with the tea brewing equipment of the present invention. The beverage producing equipment of the present invention is suitable for both office and home use.

DETAILED DESCRIPTION OF THE PREFERRED EMBODIMENTS

A preferred embodiment of a beverage substance cartridge, a filtering apparatus, a beverage producing equipment, a beverage producing system and a beverage producing method in the invention will be described in detail hereinbelow with reference to the drawings. However, the invention is not only limited to the embodiment. Specific details are given in the following preferred embodiment of the invention to give the public a thorough understanding about the invention.

Embodiment

Figure 1:
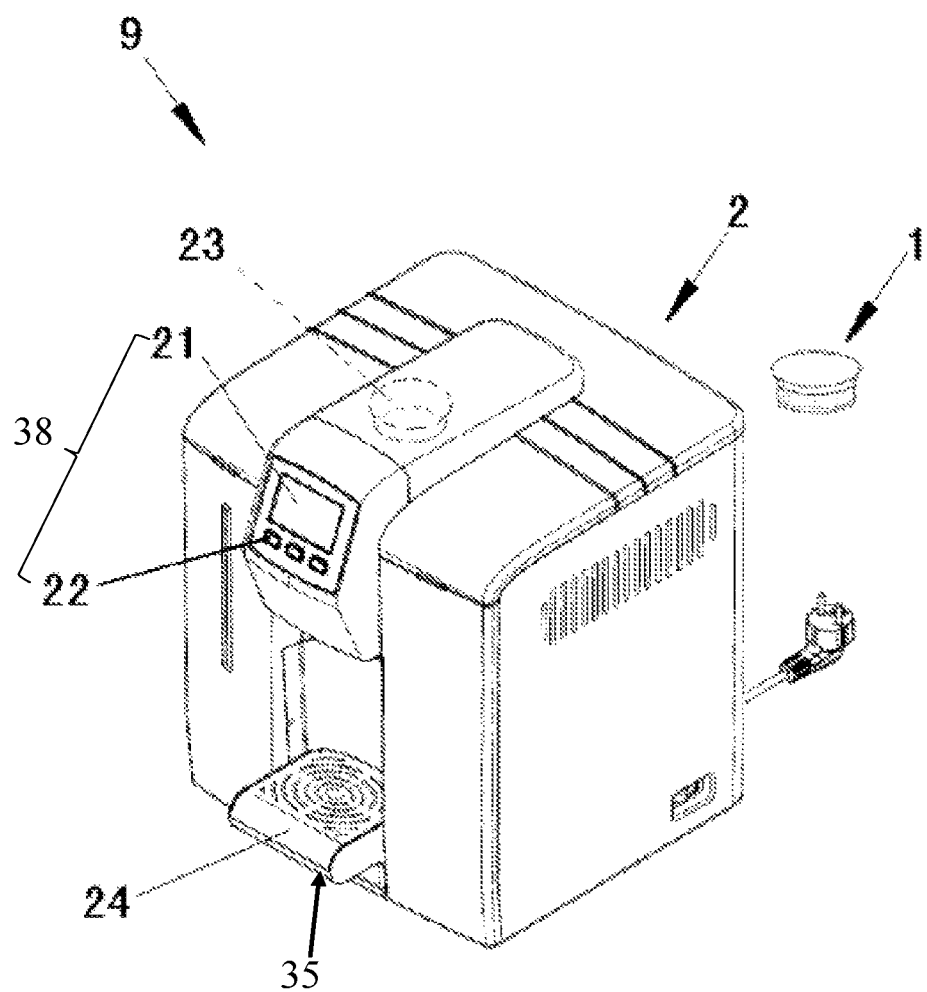
FIG. 1 is a structural illustration of a beverage producing system of the embodiment of the invention.

As shown by FIG. 1, a beverage producing system 9 includes a beverage substance cartridge 1 and a beverage producing equipment 2 for collaborative use.

The beverage producing equipment 2 has a display screen 21 and a keyboard 22.

The beverage producing equipment 2 has a cavity 23 corresponding to the beverage substance cartridge 1 in size and shape to receive the beverage substance cartridge 1, and the cavity 23 has a cover on the top.

The beverage producing equipment 2 has a supporting platform 24, and the supporting platform 24 is a detachable level platform suitable to receive the cups.

The beverage producing equipment 2 may be used in conjunction with different beverage substance cartridges 1. A user only needs to select a beverage substance cartridge 1, place the beverage substance cartridge 1 into the cavity 23 of the beverage producing equipment 2 and operate the beverage producing equipment 2 according to prompts on a display screen 21 to receive the brewed beverage in a minute.

Figure 2:
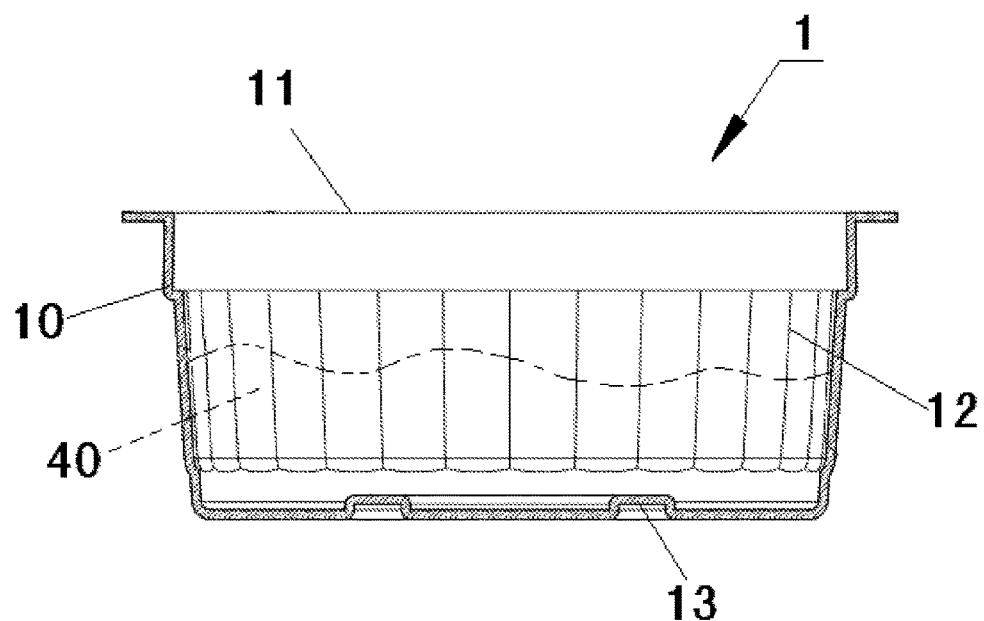
FIG. 2 is a structural illustration of a beverage substance cartridge of the embodiment of the invention.
Figure 3:
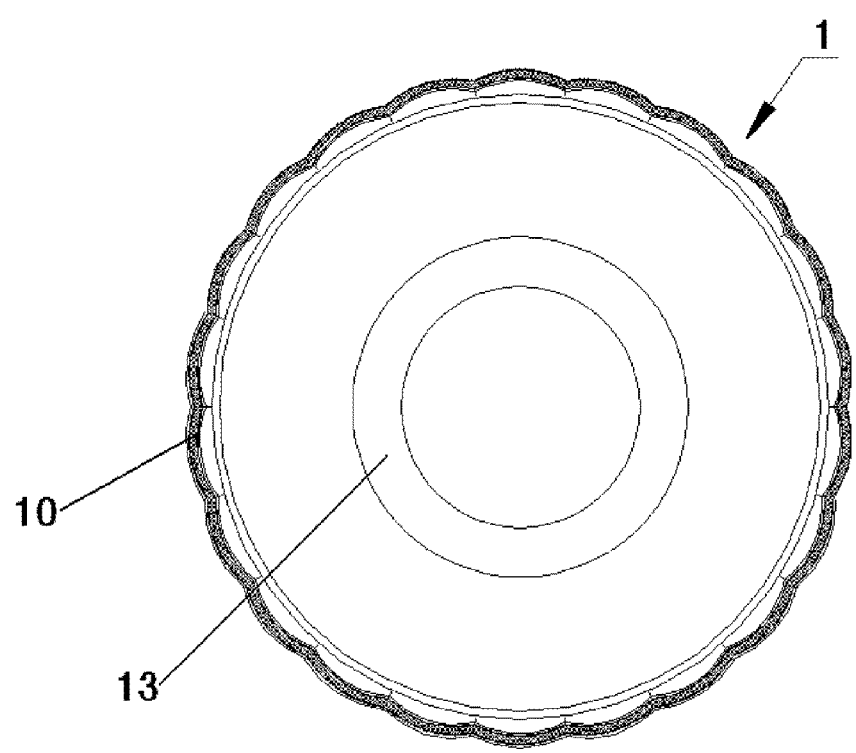
FIG. 3 is a transverse cross section drawing of the beverage substance cartridge of the embodiment of the invention.

As shown in FIG. 2 and FIG. 3, the beverage substance cartridge 1 includes a cartridge body 10 and a sealing cover 11. The cartridge body 10 accommodates the substance 40 for beverage production. The sealing cover 11 seals the substance 40 to keep it in the cartridge body 10.

The side wall of the cartridge body 10 is integrally formed with a plurality of arc sections and an internal convex edge 12 is formed where two adjacent arc sections are joined, such that the side wall has many rolling edges 12. Water inside the beverage substance cartridge 1 forms a vortex when the water contacts the side wall of the cartridge body 10, thereby promoting contact between the water and the tea leaf, i.e., the substance 40, and improving extraction efficiency.

The cartridge body 10 is made of polypropylene substance, so it is light and solid. The cartridge body 10 is pierced by a needle-shaped piercing point of the water filling apparatus to fill it with hot water. The cartridge body 10 also bears the pressure formed on the side wall of the cartridge body when the vortex is flowing within the cartridge body 10.

Convex or sunk circular rings 13 are at the bottom of the cartridge body 10 to strengthen the cartridge body 10 so it can bear the pressure formed on the bottom of the cartridge body 10 by the vortex flowing within the cartridge body 10.

In the embodiment, the diameter of the bottom surface of the cartridge body 10 is 38 mm, the diameter of the sealing cover 11 is 50 mm, the inner diameter of the circular ring at the bottom of the cartridge body 10 is 12 mm, and the outer circle's diameter is 20 mm. The circular ring 13 at the bottom of the cartridge body 10 is raised upwards. The distance between two adjacent edges is 5 mm, and the arched convex between two adjacent edges is 1.2 mm thick.

Figure 4:
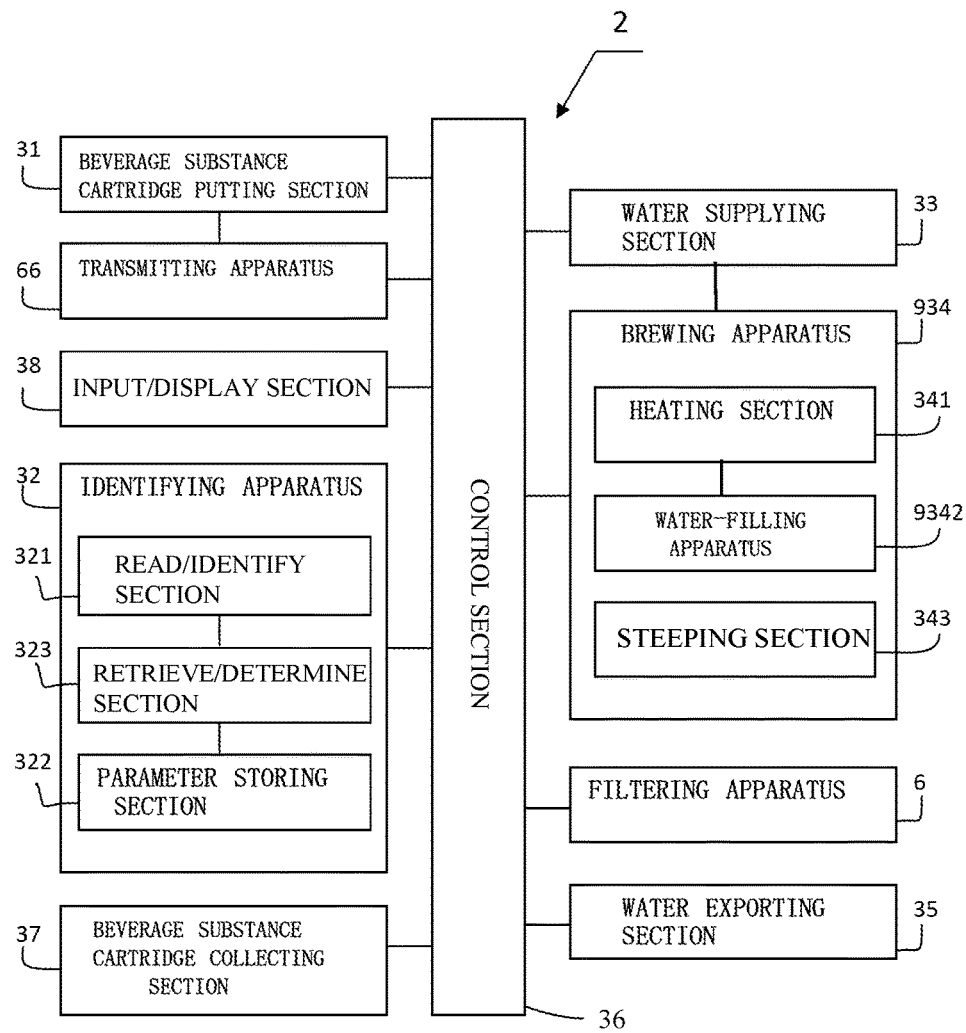
FIG. 4 is a structural diagram of a beverage equipment of the beverage substance cartridge of the embodiment of the invention.

As shown by FIG. 4, the beverage producing equipment 2 includes a beverage substance cartridge putting section 31, an input/display section 38, an identifying apparatus 32, a water supplying section 33, a brewing apparatus 934, a water exporting section 35, a control section 36 and a beverage substance cartridge collecting section 37.

The beverage substance cartridge putting section 31 which receives the beverage substance cartridge 1 includes a cavity 23, as shown in FIG. 1, which corresponds to the size and shape of the beverage substance cartridge 1.

The input/display section 38 displays working information of the beverage producing equipment 2 and information regarding the beverage substance 40, and used by the operator to input control commands. The input/display section 38 includes the display screen 21 and the keyboard 22, as shown in FIG. 1.

The display screen 21 displays working status of the beverage producing equipment 2 and also displays relevant information about various beverage substances 40 (such as tea leaf). The keyboard 22 is set with corresponding keys to selectively control the operation of the beverage producing equipment 2, for example, to retrieve relevant beverage information or to select output commands.

The identifying apparatus 32 is used to identify the substance 40 in the beverage substance cartridge 1. The identifying apparatus 32 has a read/identify section 321, a parameter storing section 322 and a retrieve/determine section 323. The read/identify section 321 is used to read an identification label 14 in the beverage substance cartridge and identify the identification codes corresponding to the identification label 14.

The pattern identifying unit that reads the identification label 14 is an image pick-up apparatus, such as a camera. The read/identify section 321 decodes the identification label 14 read into an identification code recognizable by the equipment. A cache (not shown in the figure) is set inside the read/identify section 321 stores the decoded identification code which can be used for comparison with the next decoded identification code. The parameter storing section 322 stores the brewing parameters. The water supplying section 33 supplies water for beverage production.

The brewing apparatus 934 brews the substance 40 according to the brewing parameters determined by the retrieve/determine section 323. Also, the brewing apparatus 934 has a heating section 341, a water-filling apparatus 9342 and a steeping section 343.

The heating section 341 heats the water supplied by the water supplying section 33. The heating section 341 has a temperature sensor connected to the control section 36. The temperature sensor detects the temperature of the water in the heating section 341 in a real-time and the control section 36 displays the temperature reading on the display screen 21 so that the users can learn about Teaism in the beverage brewing process.

Figure 5:
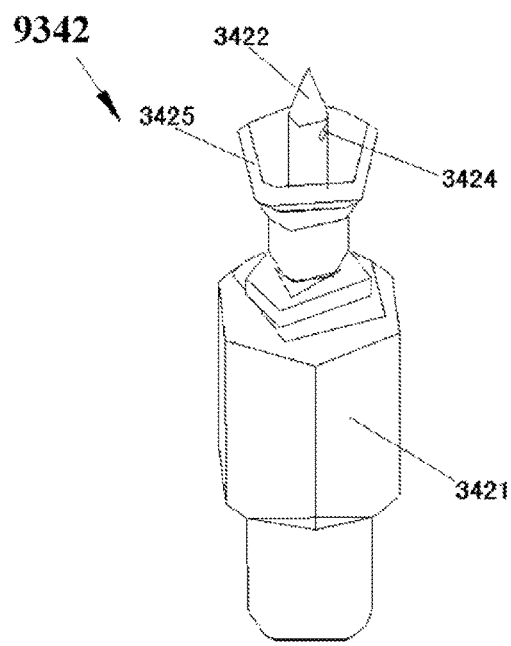
FIG. 5 is a structural illustration of a filling apparatus in the embodiment of the invention.
Figure 6:
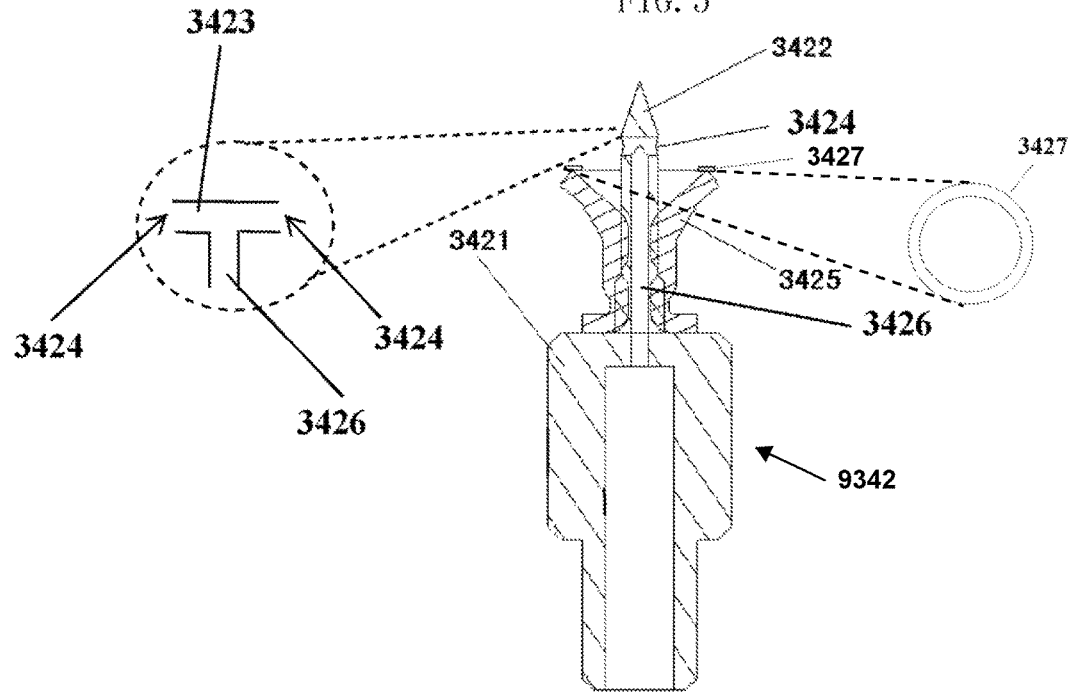
FIG. 6 is a longitudinal cross section drawing of the filling apparatus in the embodiment of the invention.

As shown in FIG. 5 and FIG. 6, the water filling apparatus 9342 includes a piping section 3421, a piercing point 3422 integrated with the piping section 3421 on the top of the piping section, and at least one water filling nozzle 3424 is set under the piercing point 3422 and connected to the piping section 3421. The water filling apparatus 9342 fills heated water into the beverage substance cartridge 1.

The shape of the piercing point 3422 can be a cone, needle shape or pyramid to pierce the bottom surface of the beverage substance cartridge 1. The piping section 3421 is connected to the water supplying section 33 and the heating section 341. The water supplied by the water supplying section 33 is heated by the heating section 341, then transported to the piping section 3421, and filled in the beverage substance cartridge 1 through the water filling nozzle 3424.

In the embodiment, there are two water filling nozzles 3424 respectively set at each side under piercing points 3422. The two water filling nozzles 3424 are connected and form a water filling pipe 3423. The piping section 3421 connecting the water filling pipe 3423 is a water inflow pipe 3426. The water filling pipe 3423 is vertical with the water inflow pipe 3426. In other embodiments, the water filling nozzle 3424 can be connected to the water inflow pipe 3426. Upon piercing of the beverage substance cartridge 1 by the piercing point 3422, the distance between the piercing point 3422 and the side wall of the beverage substance cartridge 1 is only 4 mm. The piercing point 3422 is at the bottom of the beverage substance cartridge 1 and against the side wall of the beverage substance cartridge 1. When hot water is rapidly filled into the cartridge body 10, the hot water hits the rolling edges 12 in the side wall of the cartridge body 10 to form a vortex that enhances the contact between water and substance, thereby improving the extraction efficiency.

A sealing rubber cover 3425 is set external to the piping section 3421 and seals parts in the water filling apparatus 9342, except for the piercing points 3422, to strengthen the sealing effects and prevent water leakage. A plane baffle 3427 is set where the sealing rubber cover 3425 is close to the piercing point 3422 to ensure tight sealing between the piercing point and the beverage substance cartridge 1.

Owing to the comparatively limited volume of the cartridge body 10, the water exporting section 35 exports water only while the water filling apparatus 9342 fills the water into the beverage substance cartridge 1. In order to keep the beverage substance 40 in the cartridge body 10 during the brewing process, the water should be exported through the water filling apparatus 9342 and the water exporting section 35.

As shown by FIG. 4, the steeping section 343 steeps the substance 40 as part of the brewing process. The substance 40 in accordance with an embodiment of the present invention is tea leaves, and the steeping of the tea leaves involves three processes, namely, tea wakening, presoaking and extraction.

The water exporting section 35 discharges the brewed beverage. The water exporting section 35 includes a supporting platform 24 and a water outlet (not shown in the figure. The water outlet is set above the supporting platform 24, and the brewed beverage flows out from the water outlet to a drinking cup. The supporting platform 24 is made of a hollow inside structure or cavity with some small, thin and long holes on the surface of the supporting platform. Any water overflowing from the cup flows into the cavity of the supporting platform 24.

The filtering apparatus 6 filters beverage brewed from the brewing apparatus to keep the brewed beverage substance within the beverage substance cartridge 1 instead of in the brewed beverage.

The control section 36 sends control commands to the water supplying section 33, the brewing apparatus 934 and the water exporting section 35. The control section 36 and the input/display section 38 controls the content and the operational options of the beverage producing equipment 2 displayed on the display 21.

The beverage substance cartridge collecting section 37 collects used beverage substance cartridges 1. The beverage substance cartridge collecting section 37 includes a used cup bucket. The supporting platform 24 is pushed in and pulled out of the beverage producing equipment 2. The rear part of the supporting platform 24 is connected with a square-shaped used cup bucket. After the completion of the brewing process, the mechanical apparatus in the beverage producing equipment 2 inverts the beverage substance cartridge putting section 31, and discards the used beverage substance cartridges into the used cup bucket for collection. To dispose of the used beverage substance cartridges in the used cup bucket, the operator pulls out the supporting platform 24 from the beverage producing equipment 2.

Figure 7:
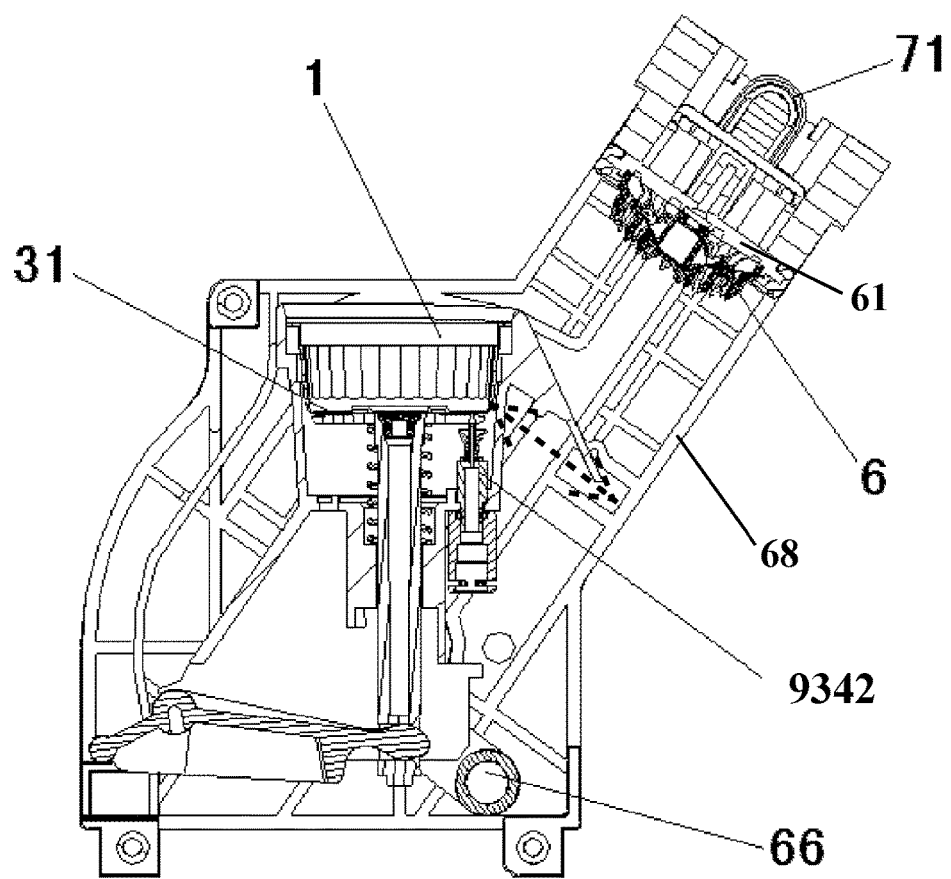
FIG. 7 is a structural illustration of a conveying apparatus of the embodiment of the invention.

As shown by FIG. 7, the filtering apparatus 6 and the conveying apparatus 66 are mounted on a rack 68 inside of the beverage producing equipment 2. The filtering apparatus 6 is set on the top of the rack 68. The beverage substance cartridge putting section 31 is fixed on the conveying apparatus 66. In the initial state, the beverage substance cartridge putting section 31 is on top of the beverage producing equipment 2, and a moveable cover plate is positioned above the beverage substance cartridge putting section 31 to enable the users to place the beverage substance cartridge 1 into the cavity 23. In operation, the conveying apparatus 66 drives the beverage substance cartridge putting section 31 housing the beverage substance cartridge 1 slantways to move, shifts or slide the beverage substance cartridge putting section 31 between two positions.

The filtering apparatus 6 includes a funnel 71 buckled on the reverse side of the base plate 61. The funnel 71 is sealed and connected to the base plate 61 to prevent leakage of the tea leaves. The water outlet of the funnel 71 is connected to the water exporting section 35 and the funnel 71 gathers filtered tea water and transports the filtered tea water to the water exporting section 35.

Figure 8:
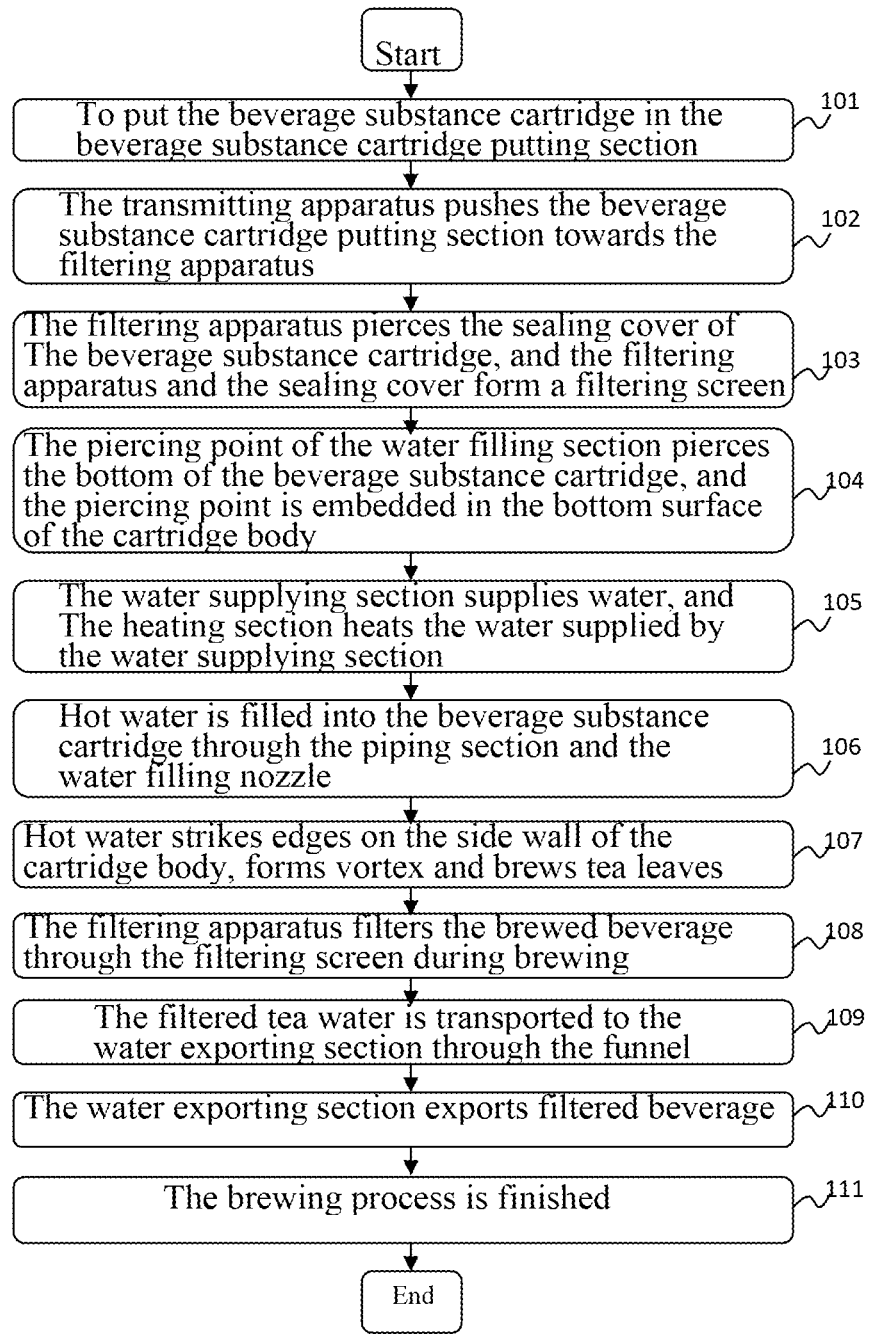
FIG. 8 is an action flowchart of the beverage equipment in the embodiment of the invention.

As shown in FIG. 8, there is illustrated a flowchart of the beverage producing method using the beverage producing system to produce the brewed beverage. The steps of the action flow of the beverage producing equipment 2 is detailed herein.

The beverage substance cartridge 1 is placed in the beverage substance cartridge putting section 31, and the cover is closed (Step 101).

User commands are inputted in the input/display section 38 using the keyboard 22, the control section 36 sends commands to the water supplying section 33, the brewing apparatus 34 and the conveying apparatus 66. The conveying apparatus 66 moves the beverage substance cartridge putting section 31 slantways and pushes the beverage substance cartridge putting section 31 towards the filtering apparatus 6 (Step 102).

The filtering apparatus 6 pierces the sealing cover 11 of the beverage substance cartridge 1, and the filtering apparatus 6 and the sealing cover 11 forms a filtering screen to filter tea leaves (Step 103).

The piercing point 3422 of the water filling apparatus 9342 pierces the bottom of the beverage substance cartridge 1. The piercing point 3422 is embedded in the bottom surface of the cartridge body 10, and the shortest distance between the piercing point 3422 and the rim of the cartridge body 10 is 4 mm (Step 104).

The water supplying section 33 supplies water for beverage production, and the heating section 341 heats the water supplied by the water supplying section 33 (Step 105).

The water heated by the water heating section 341 is filled into the beverage substance cartridge 1 through the piping section 3421 and the water filling nozzle 3424 in sequence (Step 106).

The hot water from the water filling nozzle 3424 hits the edge on the side wall of the cartridge body 10 to form a vortex and to brew the tea leaves (Step 107).

The filtering apparatus 6 filters the brewed tea water through the filtering screen during the brewing process (Step 108).

The filtered tea water is discharged to the water exporting section 35 through the funnel 71 (Step 109).

The water exporting section 35 discharges the filtered tea water into a cup to be consumed by the user (Step 110).

After the completion of the brewing process, the control section 36 sends a command to the beverage substance cartridge collecting section 37 which collects the beverage substance cartridge (Step 111).

The water filling apparatus 9342 of the beverage producing equipment 2 fills the hot water into the bottom of the beverage substance cartridge 1 near the side wall of the cartridge body 10 and forms vortex in the beverage substance cartridge 1 to speed the extraction process. Inside convex edges are set on the side wall of the beverage substance cartridge 1 and hot water temperature is high enough to enhance extraction process to realize a rapid brewing by the beverage producing equipment 2.

The substance 40 in the cartridge body 10 can be any one of or a combination of at least two of tea leaf, dried vegetable, dried fruit and Chinese medicinal herb, and a filtering apparatus filters used substance residue. The substance 40 in the cartridge body 10 also can be any one of or a combination of at least two of coffee, milk tea and tang. Beverage substance 40 is rapidly soluble in water, so the filtering apparatus is necessarily required. The beverage producing system of the present invention can be used to produce tea drinks, fruit and vegetable drinks, Chinese medicinal herb drinks for health benefits, etc. Some tea leaves can be brewed repeatedly for more than one time.

Thanks to the technical features described herein, the present invention, compared with currently available tea brewing equipment, has advantages and positive effects.

The present invention provides the beverage substance cartridge, the tea filtering apparatus, the beverage producing equipment, the beverage producing system and the beverage producing method. The water filling apparatus of the beverage producing equipment fills hot water into the bottom of the beverage substance cartridge near the side wall of the cartridge body, and forms a vortex within the beverage substance cartridge which efficiently speeds the extraction process. Further, the inside convex edges are set at the side wall of the beverage cartridge and hot water temperature is high enough to enhance extraction process to realize rapid brewing with the tea brewing equipment of the present invention. The beverage producing equipment of the present invention is suitable for office and home uses.

What is claimed is:

1. A beverage producing equipment to produce a beverage by using a beverage substance in a beverage substance cartridge, comprising:
   a cartridge holder to receive said beverage substance cartridge;
   a brewing apparatus which brews said beverage substance into said beverage;
   a water supply section to supply water to said brewing apparatus for beverage production;
   a filtering apparatus mounted on a top of a rack inside the beverage producing equipment to filter said beverage brewed by said brewing apparatus;
   a conveying apparatus mounted on the rack, said cartridge holder fixed on said conveying apparatus, wherein said conveying apparatus moves said cartridge holder slantways to shift said cartridge holder and said beverage substance cartridge from a top of the beverage producing equipment to the filtering apparatus;
   wherein said brewing apparatus comprises a heating section to heat water supplied by said water supply section and a water filling apparatus which fills heated water into said beverage substance cartridge;
   wherein said water filling apparatus comprises a piping section having a piercing point on top of said piping section and two water filling openings connected to said piping section and a sealing rubber cover positioned on said piping section, said piercing point is integrally formed with said piping section and said two water openings are set under two opposite sides of said piercing point to form vortices inside said beverage substance cartridge at corresponding opposite sides of said beverage substance cartridge as the water bumps the corresponding opposite sides of said beverage substance cartridge to enhance contact between the water and the beverage substance in said beverage substance cartridge;

wherein said sealing rubber cover has a Y-shaped cross-section in a vicinity of said piercing point, to limit a length of said piercing point entering a cartridge body of said beverage substance cartridge and wherein a distal end of the sealing rubber cover configured to seal a piercing site on said cartridge body is wider than a proximal end of the sealing rubber cover;

wherein said sealing rubber cover is sleeved on a water inflow pipe and located between said two water filling openings and said piping section; and wherein said piercing point pierceable into said beverage substance cartridge is configured to be 4 mm from a sidewall of said cartridge body to form said vortices to improve contact between the water and the beverage substance in said beverage substance cartridge, thereby improving an extraction efficiency of the beverage substance.

2. The beverage producing equipment according to claim 1, further comprising a water exporting section to export said beverage received from said filtering apparatus.

3. A beverage producing system, comprising said beverage producing equipment of claim 2; wherein said cartridge body accommodates said beverage substance for beverage production; wherein said beverage substance cartridge further comprises a sealing cover to seal said beverage substance within said cartridge body; and wherein a side wall of said cartridge body comprises a plurality of arcuate parts.

4. A beverage producing method which produces beverage by the beverage producing system of claim 3, comprising the steps of:

said beverage substance cartridge is placed in said cartridge holder;

said conveying apparatus moves said cartridge holder slantways from the top of the beverage producing equipment to said filtering apparatus;

said filtering apparatus pierces said sealing cover of said beverage substance cartridge;

said filtering apparatus and said sealing cover forms a filtering screen to filter said beverage substance;

said piercing point of said water filling apparatus pierces the bottom of a cartridge body of said beverage substance cartridge;

said piercing point's piercing position is close to a sidewall of said cartridge body of said beverage substance cartridge;

hot water forms a vortex when bumping against external convex surface and internal convex edge, and brews said beverage substance; and said water exporting section exports brewed beverage during brewing.

5. The beverage producing equipment according to claim 1, wherein said beverage substance cartridge is made of polypropylene material, and wherein said beverage substance cartridge further comprises a sealing cover, a diameter of a bottom surface of said cartridge body being 38 mm, a diameter of said sealing cover being 50 mm, an inner diameter of a circular ring at the bottom surface of said cartridge body being 12 mm, and a diameter of an outer diameter of the circular ring being 20 mm.

6. The beverage producing equipment according to claim 1, wherein convex or concave rings are on a bottom of said beverage substance cartridge, said concave rings being raised upwards; and wherein a distance between two adjacent edges of said concave rings being 5 mm, and an arched convex between said two adjacent edges being 1.2 mm thick.

7. The beverage producing equipment according to claim 1, wherein said beverage substance in said beverage substance cartridge is any one of or a combination of at least two of tea leaf, dried vegetable, dried fruit and Chinese medicinal herbs.

8. The beverage producing equipment according to claim 1, wherein said beverage substance in said beverage substance cartridge is any one of or a combination of at least two of coffee, milk tea and TANG powder.

9. The beverage producing equipment according to claim 1, wherein the shape of said piercing point is in the shape of a cone.

* * * * *